United States Patent
Fedorenko et al.

(10) Patent No.: US 9,576,368 B2
(45) Date of Patent: Feb. 21, 2017

(54) METHOD AND DEVICE FOR OPTICALLY DETERMINING A POSITION AND/OR ORIENTATION OF AN OBJECT IN SPACE USING A TWO DIMENSIONAL IMAGE TO GENERATE THREE DIMENSIONAL INFORMATION

(71) Applicant: GEA Farm Technologies GmbH, Bönen (DE)

(72) Inventors: Sergey Igorevitch Fedorenko, St. Petersburg (RU); Konstantin Korovin, St. Petersburg (RU)

(73) Assignee: GEA Farm Technologies GmbH, Bönen (DE)

( * ) Notice: Subject to any disclaimer, the term of this patent is extended or adjusted under 35 U.S.C. 154(b) by 124 days.

(21) Appl. No.: 14/389,721

(22) PCT Filed: Mar. 27, 2013

(86) PCT No.: PCT/EP2013/056596
§ 371 (c)(1),
(2) Date: Sep. 30, 2014

(87) PCT Pub. No.: WO2013/149916
PCT Pub. Date: Oct. 10, 2013

(65) Prior Publication Data
US 2015/0071491 A1  Mar. 12, 2015

(30) Foreign Application Priority Data

Apr. 3, 2012 (DE) .................... 10 2012 102 915

(51) Int. Cl.
*G06K 9/00* (2006.01)
*G06T 7/00* (2006.01)
*A01J 5/017* (2006.01)

(52) U.S. Cl.
CPC ............ *G06T 7/0046* (2013.01); *A01J 5/0175* (2013.01); *G06T 2207/10012* (2013.01); *G06T 2207/10028* (2013.01); *G06T 2207/20116* (2013.01)

(58) Field of Classification Search
CPC ......... A01J 5/0175; G06T 2207/10012; G06T 2207/10028; G06T 2207/20116; G06T 7/0046
See application file for complete search history.

(56) References Cited

U.S. PATENT DOCUMENTS

| 5,483,441 A | 1/1996 | Scofield |
| 7,490,576 B2 | 2/2009 | Metcalfe et al. |

(Continued)

FOREIGN PATENT DOCUMENTS

| RU | 2143800 C1 | 1/2000 |
| WO | WO2009018538 | 2/2009 |
| WO | WO2010023121 | 3/2010 |

OTHER PUBLICATIONS

Anonymus: "anyfeed SXM100", Jan. 5, 2012 Seiten 1-1,XP002698807, Gefunden im Internet: URL:http://web.archive.org/web/20110930002431/http://www.flexfactory.com/index.php?page=anyfeed-sxml00[gefunden am Jun. 13, 2013]das ganze Dokumen.

(Continued)

*Primary Examiner* — Nirav G Patel
(74) *Attorney, Agent, or Firm* — Smith Law Office; Jeffry W. Smith

(57) ABSTRACT

The invention relates to a method for optically determining the position and/or orientation of an object in space on the basis of images from at least one camera (24a, 24b). At least one 2D image of the object is recorded; 2D contour information is extracted from the image. On the basis of the contour information, at least one area (40) of the object is (Continued)

determined. Furthermore, 3D information is obtained from the at least one 2D image or a further 2D image. A portion situated within the determined area (40) of the object is selected from this 3D information. The position and/or orientation of the object is then determined on the basis of the selected portion of the 3D information. The invention furthermore relates to a use of the method, a device for carrying out the method and a milking robot with such a device.

19 Claims, 5 Drawing Sheets

(56) References Cited

U.S. PATENT DOCUMENTS

| | | | |
|---|---|---|---|
| 2002/0149585 A1 | 10/2002 | Kacyra et al. | |
| 2006/0196432 A1* | 9/2006 | Peacock | A01J 5/0175 119/14.08 |
| 2009/0290811 A1 | 11/2009 | Imai | |
| 2011/0196661 A1 | 8/2011 | Spicola et al. | |
| 2012/0199073 A1* | 8/2012 | Hofman | A01J 5/0175 119/14.02 |
| 2013/0071875 A1* | 3/2013 | Zemer | G01N 15/1475 435/34 |
| 2014/0000520 A1* | 1/2014 | Bareket | A01J 5/0175 119/14.02 |

OTHER PUBLICATIONS

Awcock G Ed—Howlett R J et al: "Where is the intelligence in machine vision?", Knowledge-Based Intelligent Engineering Systems and Allied Technologie S, 2000. Proceedings. Fourth International Conference on Brighton, UK Aug. 30-Sep. 1, 2000, Piscataway, NJ, USA,IEEE, US, Bd. 1, 30. Aug. 2800 (Aug. 30, 2000), Seiten 25-32, XP010523055, DOI: 10.1109/KES.2000. 885755 ISBN: 978-0-7803-6480-4 Seite 30, linke Spalte, Zeile 6-Zeile 21.

International search report and written opinion in corresponding application No. PCT/EP2013/056596 dated Feb. 13, 2014.

* cited by examiner

METHOD AND DEVICE FOR OPTICALLY DETERMINING A POSITION AND/OR ORIENTATION OF AN OBJECT IN SPACE USING A TWO DIMENSIONAL IMAGE TO GENERATE THREE DIMENSIONAL INFORMATION

The invention relates to a method and a device for optically determining a position and/or orientation of an object in space on the basis of images from at least one camera.

Such methods and devices are used in particular in robot control. In some applications, objects that are to be gripped, processed or otherwise manipulated by a robot are not fixed in their position and orientation in space or at least have great freedom with respect to their position and orientation within prescribed limits. In order to be able to automatically manipulate such objects in a specific manner, it is absolutely necessary to have object detection, position and possibly orientation detection, which ultimately relies on a determination of surface coordinates of the object. This proves to be particularly difficult if the shape and size of the object is not fixed in a determined sense, but for its part can be subject to certain variations.

Particularly high requirements for such a method or a device for determining the surface coordinates of an object in space arise if living beings are involved as "objects". In the case of milking robots for cows or other dairy animals there is for example the task of automatically attaching one or more milking cups to the teats of a milk-yielding animal. In this case, it is just as impossible to fix precisely the position of the animal as it is to fix precisely the position and/or orientation of the individual teats. Moreover, the shape and size and relative arrangement of the teats to one another vary individually from animal to animal. Even if the animal is identified on the basis of identification features or devices, details of the shape and size of the teats also change according to the time of day, the state of health and nutrition of the animal, and finally also as a result of growth or ageing. An additional requirement arises from the fact that the animals usually do not stand still during the process of attaching the milking cups, but instead can change their position within a milking parlour. In addition, movements due to breathing, taking up feed or chewing or ruminating occur. In order to make reliable location of the teats and attachment of the milking cups possible, quickest possible determination of their surface coordinates in space, ideally in real time, is therefore required.

The document US 2006/019 64 32 A1 discloses a device for locating teats of milk-yielding animals for a milking robot in which, on the basis of images of one or preferably a number of cameras, the position of the tips of teats is extracted from the images with the aid of an edge detection process. In particular when using two or more cameras, the position of the ends of the teats in space can be determined by way of methods of triangulation.

The document WO 2010/023 121 A2 discloses for determining the position of teats of a milk-yielding animal using a projection device to project onto the area of the animal's udder and teats a pattern that is then evaluated by two cameras using methods of triangulation. The stereoscopic evaluation of the projected pattern is suitable for providing information concerning the three-dimensional surface structure of an object in real time.

It is also known in the case of milking robots to use other techniques by which information concerning the three-dimensional structure can be obtained. Mention may be made here for example of ultrasonic or else optical time-of-flight measurements (TOF—Time-of-Flight). With these techniques, however, highly sophisticated apparatus is necessary in order to achieve a high degree of accuracy of the results.

Nevertheless, there is the need for a method and a device of the type mentioned at the beginning with which the position and possibly the orientation of an object in space can be determined quickly and precisely with a high degree of accuracy in all spatial directions.

This task is achieved by a method and a device with the features of the independent claims.

According to a method according to the invention, an optical determination of the position and/or orientation of an object in space is performed on the basis of images from at least one camera. At least one 2D image of the object is recorded and 2D contour information is extracted from the image. On the basis of the contour information, at least one area of the object is determined. Furthermore, 3D information is obtained from the at least one 2D image or a further 2D image. From this 3D information, a portion situated within the determined area of the object is selected. Then the position and/or orientation of the object is determined on the basis of the selected portion of the 3D information.

The method thus advantageously combines 2D and 3D information obtained about the object. The contour information can be extracted from the 2D images with comparatively little computational effort, and correspondingly quickly and reliably. It serves for object detection. The restriction of the evaluation of the 3D information to the object area detected means that a separation of 3D information that is relevant and not relevant with regard to the object is achieved. Thus, the 3D information obtained can be evaluated effectively for determining the position of the object, in particular with regard to the distance from the camera, and for determining the orientation.

In advantageous refinements of the method, the 3D information is obtained stereoscopically from 2D images from at least two spaced-apart cameras and/or from 2D images from at least one camera when the object is lit up by a projector for the projection of a pattern. A line, grid, point or 2D position-code pattern is preferably used in this case. In both refinements, implementation of the method with robust and low-cost optical devices is possible.

In a further advantageous refinement of the method, a contour line is extracted from the determined contour information and used to form a body of revolution with a principal axis. The position of the principal axis in space is varied such that the measured 3D information from the selected area is in total situated as close as possible to a lateral surface of the body of revolution, the position of the principal axis dictating the orientation of the object in space. Preferably, a point of intersection of the body of revolution with the principal axis is determined and output as the position of a tip of the object in space. On the assumption that the object can be represented in good approximation in a model as a rotationally symmetrical body, this provides an evaluation of the 3D information that leads to a determination of the position and also the orientation with a high degree of accuracy.

A device according to the invention for optically determining the position and orientation of an object in space has at least one camera and is distinguished by the fact that it is designed for carrying out the aforementioned method. The advantages specified in connection with the method are obtained.

In advantageous refinements, the device has at least two spaced-apart cameras and/or at least one projector for the projection of a line, grid, point or 2D position-code pattern.

According to a further aspect of the invention, the aforementioned method is used for determining the spatial position and orientation of a teat of a dairy animal. In this case, the high degree of accuracy of the method and the high speed with which it can be carried out are of advantage, just as is the possibility of being able to carry out the method with robust optical components, such as cameras and possibly projectors. Correspondingly, according to a further aspect of the invention, a milking robot has an aforementioned device.

Further advantageous refinements and developments are specified in the respective dependent claims.

The invention is explained in more detail below on the basis of exemplary embodiments with the aid of six figures, in which.

The method according to the invention is explained below on the basis of a device for detecting the position and orientation of teats of a milk-yielding animal. It goes without saying that the method described and the device for determining the surface coordinates of an object in space can also be used in connection with tasks from other areas involving robotics. In abstract terms, the task in the case of a milking robot is to align an implement translationally and/or rotationally in relation to an object of which the position in space must be detected. This task is encountered in many areas of application involving robotics.

Figure 1:
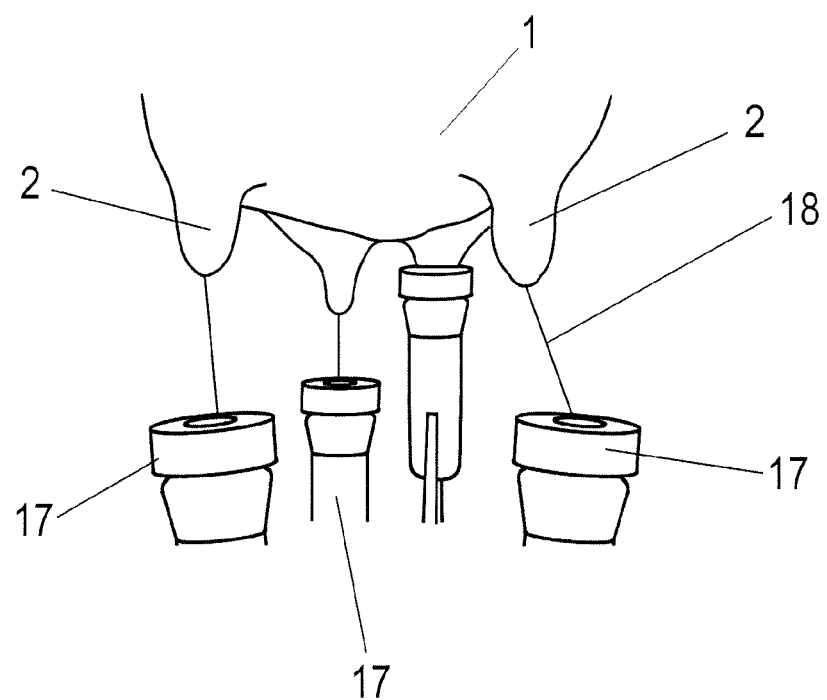
FIG. 1 shows a schematic representation of a detail of a milking robot when attaching milking cups to teats of a milk-yielding animal.

FIG. 1 illustrates this task in a perspective drawing of a detail for the chosen exemplary embodiment of a milking robot. An udder 1 of a dairy animal, for example a cow, with four teats 2 is represented. Milking cups 17 are brought up to the udder 1 by a robot arm that is not represented here and are then attached one after the other to the teats 2. For this purpose, the position of the tips of the teats 2 must be detected and the movement of the milking cups 17 along a path of movement 18 must be controlled and corrected in such a way that the milking cups 17 approach with their openings the tips of the teats 2 from below, without the teats 2 being missed or pushed away to the side. Negative pressure may in this case be applied to the openings of the milking cups 17, so that, when the milking cups 17 are suitably made to approach the tips of the teats 2, the latter are sucked into the opening. On account of the flexibility of the teats 2, an orientation of the milking cups 17 in space and an adaptation to the orientation of the teats 2 in space is not required. However, these can possibly be performed. Nevertheless, if teats are inclined at an angle, the probability of attachment is reduced and there is also the risk of the animal being injured. It is therefore advantageous if the milking robot receives information concerning the orientation of the teats 2 and the positioning of the milking cups 17 is adapted correspondingly.

Figure 2:
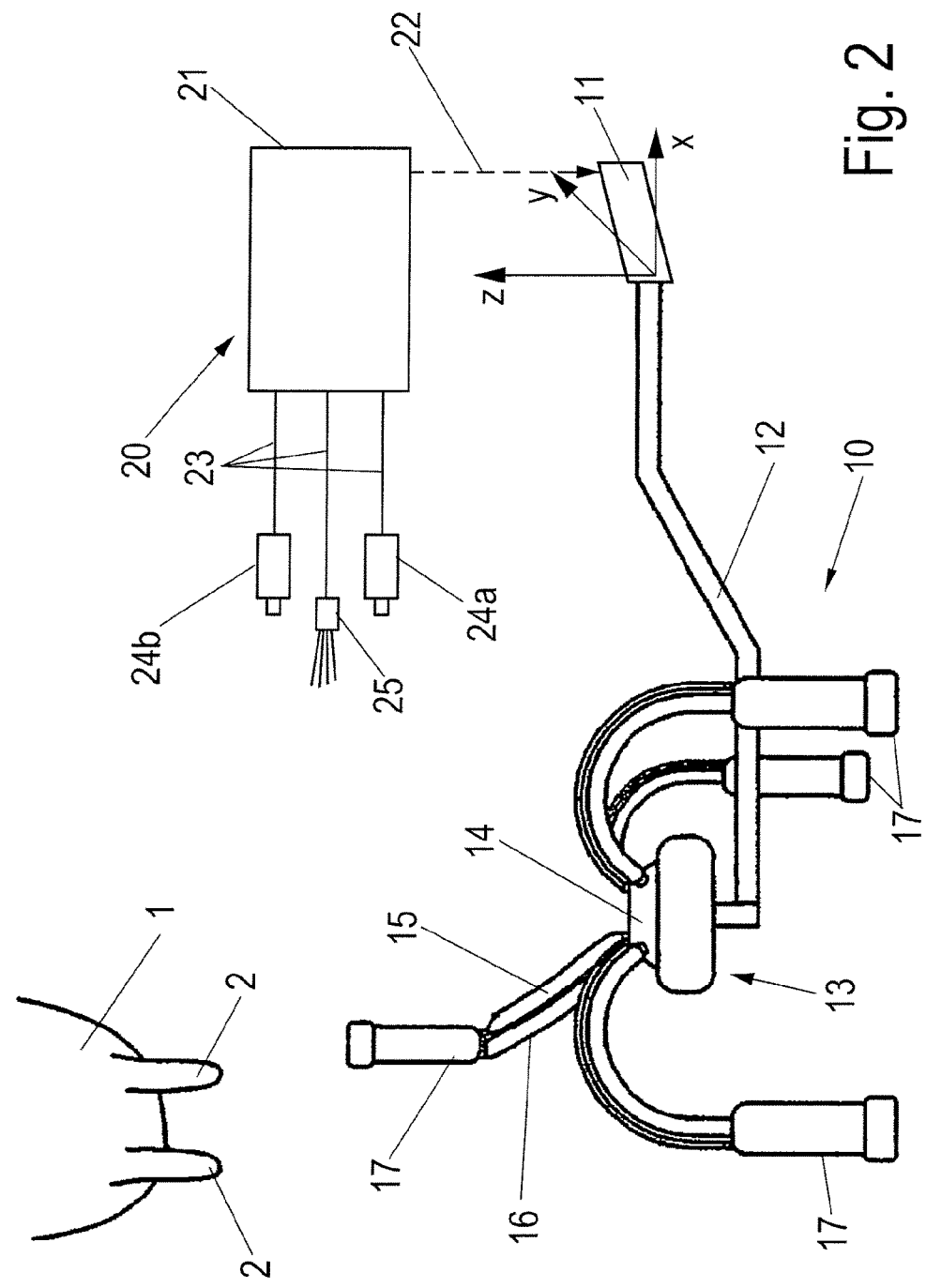
FIG. 2 shows a schematic representation of part of a milking robot with a device according to the invention.

FIG. 2 shows, likewise in a schematic representation, the part of a milking robot that is relevant within the scope of the application. This comprises a milking device 10 and a device 20 for detecting the position of the teats 2 and for activating the milking device 10.

The milking device 10 has a carrying arm 12, which is coupled to actuators 11 and at the end of which the milking cluster 13 is arranged. The actuators 11 allow a movement of the carrying arm 12 with degrees of freedom in a number of spatial dimensions.

The milking cluster 13 held and positioned by the carrying arm 12 has a milk collector 14, which is connected respectively to milking cups 17 by way of milk tubes 15 and further actuators 16. By way of the further actuators 16, the milking cups 17 can for example be respectively moved from a lowered position into a raised position. In FIG. 2, some of the milking cups 17 are in the lowered position and some of the milking cups 17 are in the raised position. The actuators 16 are in this case equipped with elastic elements that allow a movement of the milking cups 17 with respect to one another even in the raised position. It is achieved in this way that, by movement of the carrying arm 12, a milking cup to be attached can be positioned and brought to the tip of the teat 2 on the path of movement 18 even when one or more of the other milking cups 17 have already been attached.

The device 20 serves for controlling the actuators 11 and the further actuators 16 of the milking device 10 for attaching the milking cups 17 to the teats 2. For this purpose, the device 20 comprises an image-processing and control device 21, which is referred to hereinafter as the control device 21. The control device 21 has one or more control outputs 22, by way of which it is connected to the milking device 10 for the actuation of its actuators 11 and further actuators 16. Furthermore, the control device 21 has data connections 23, by way of which it is connected to optical devices that are used in association with position detection.

In the present exemplary embodiment, two cameras 24a, 24b, which are spaced apart from one another and are aligned with the area of the udder 1, are used as optical devices. Also provided is a projector 25 for the projection of light structures. It is noted that the cameras 24a, 24b and the projector 25 represent examples of optical devices with which the method according to the application can be performed. In alternative refinements of the device, alternative and/or further optical devices may be used. In principle, there may be any desired number of cameras and projectors. Multiple cameras or sequentially operated projectors are advisable if there is a risk of obscuration, for example by the milking cups. In particular, multiple projectors are effective in this respect, since they can be produced at low cost.

For the implementation of the method according to the application, the control device 21 has one or more program-controlled processors, including possibly graphic processors and/or digital signal processors and/or FPGAs (Field Programmable Gate Arrays). Parts of the method may in this case be software-implemented, other parts, in particular time-critical or calculation-intensive method steps, may also be hardware-implemented.

On the basis of the figures described below, various exemplary embodiments of a method according to the application for determining surface coordinates of an object in space are described in more detail, reference being made to the device from FIG. 2. Designations used below therefore also refer inter alia to FIG. 2.

Figure 3:
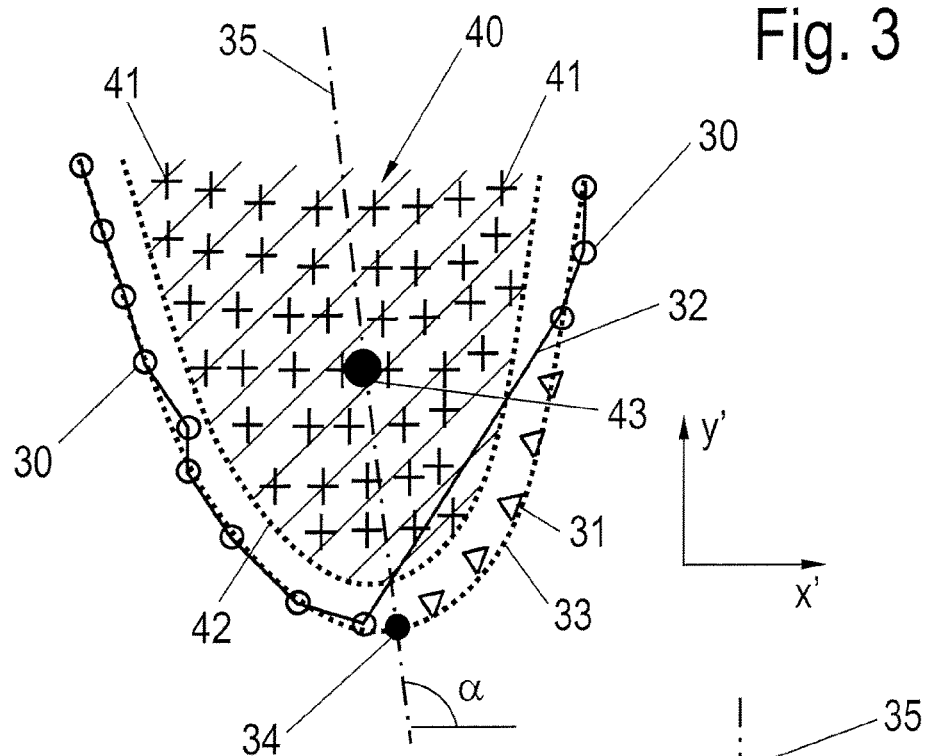
FIG. 3 shows a schematic representation of contour information obtained in the course of a method according to the invention.

FIG. 3 illustrates a first exemplary embodiment of the method according to the invention. It is assumed that first one of the two cameras 24a or 24b provides an image of the udder 1, which is recorded under certain prescribed light conditions, for example in a backlight situation. Such a "backlight" situation can be achieved for example by a bounding wall of a milking parlour that is located on the opposite side of the animal, as seen from the position of the camera 24a, 24b, being lit up by a light source. Conceivable, however, are lighting situations in which lighting takes place from the camera side ("frontlight") or in which diffuse lighting from a number of sides is used. For reasons of simpler representation, a backlight situation is initially assumed. Corrections that possibly have to be performed in the evaluation if there is some other lighting situation are explained in connection with FIG. 4.

The camera image from the camera 24a or 24b is also referred to hereinafter as a 2D image, since it is assumed that this camera image does not contain any distance information, but instead represents an image of the object recorded, here that is of the udder 1, onto a two-dimensional projection area. It is noted that images with distance information can also be based on the 2D image—the distance information is not required for the initially performed evaluation of the 2D image and can therefore be ignored in this step.

Contour information is obtained from the 2D image. Contour information may for example be extracted from a grayscale value and/or differences in color between neighboring image pixels. Known for this purpose are various algorithms or filtering functions which can be used in association with this application. Examples are so-called "Canny Edge Detection" or "Kruskal's Algorithm".

The contour points are then grouped and assigned to various objects, the grouping and assignment being based on prescribed fundamental geometries and dimensions of the relevant objects, here that is the teats 2. One prescription may be for example that only objects that can be accepted as substantially cylindrically symmetrical objects are regarded as relevant objects. Or expressed in a different way, objects of which the contours do not match those of a cylindrically symmetrical object are not considered any further.

FIG. 3 shows a plurality of determined contour points 30 (round symbols), which are assigned to a relevant object. The determined contour points 30 are joined by a contour line 32. The position of the determined contour points 30 and of the contour line 32 in the image plane of the 2D image is represented. This plane is also referred to hereinafter as the x'y' plane, where x' is a horizontal spatial direction and y' is a vertical spatial direction. It should be noted that the x' and y' coordinates concern the projection onto the image plane and do not indicate coordinates of the object in space. To differentiate, x' and y' are referred to as image coordinates. They should be distinguished from actual object coordinates, which are referred to hereinafter as x, y and z object coordinates.

However, the determined contour line 32 obtained by joining the determined contour points 30 does not necessarily, and in reality only in the rarest cases, reproduce the complete contour of the corresponding object. Parts of the object may be obscured in the 2D image or not be set apart from elements lying more in the background on account of the lighting situation. In the present specific example of an application, teats 2 being considered are often concealed by further teats 2 or other parts of the udder 1 or part of a leg or of the tail of the animal.

In the example represented from FIG. 3, such concealment causes the great distance between two neighboring determined contour points 30 in the right-hand lower area of the figure. The contour points missing in this area are depicted in the figure as presumed contour points 31. Missing contour points make it more difficult to assign determined contour points 30 to an object. In order nevertheless to be able to establish association with an object, it may be envisaged to compare the determined contour points 30 with a model of the expected object, that is in the present case a model of the teats 2. Generally, one model is sufficient. In principle, however, it is also possible to use a number of models in parallel.

The model is based on a large number of measured object contours, which are first scaled to the same size. A measured characteristic object size, for example a length or an average diameter or a diameter in the middle (with reference to the length) of the object, may be used for the scaling. A large number of object contours scaled in this way and superimposed are used to create a histogram, which reproduces a frequency distribution with which a contour point is observed at a corresponding location in the case of a likewise scaled 2D image of an object. To make it easier to handle, the histogram may be converted into a table, in which the frequency distribution is indicated by contour points in dependence on a normalized radius or diameter of the object and a normalized length.

With the aid of this table or an equivalent analytical function derived from it, obtained from a parameterization of the table values, it can be estimated with what probability a group of determined contour points 30 are associated with the same object that is assumed to be cylindrically symmetrical. If the probability exceeds a prescribed threshold value, association of the determined contour points 30 with an object is assumed.

In a next step, the group of determined contour points 30 that are assigned to an object is approximated by a model contour curve. This model contour curve is reproduced in FIG. 3 as a calculated contour line 33 in the form of a dotted line. For the example of the application of detection of the teats 2, it has been found that a polynomial with exclusively even coefficients represents a suitable model contour line. In the example of FIG. 3, the right-hand contour line is such a polynomial of the sixth order. A polynomial of some other order, possibly a higher order, may also be set for this. The order of the polynomial determines the minimum radius of curvature in the description of the contour. Under some circumstances, higher coefficients that are not required are automatically hidden in the adaptation, since their amount is determined as zero or so small that they are in fact insignificant. The calculated contour line 33 has a vertex 34 and an axis of symmetry or principal axis 35.

In the plane of the 2D image, that is in the x'y' plane, the performed evaluation of the 2D image leads to a very accurate determinability of the extremum 34 and of the principal axis 35 on account of the involved plausibilization of the association with the object of determined contour points 30 and the adaptation by the model contour line. It is the task of the method steps which then follow also to determine in addition to the information obtained here, which is reflected in the lateral position of the principal axis 35 and of the vertex 34, distance information concerning the position of the vertex 34 in the z direction that is perpendicular to the x'y' plane and to determine an inclination (tilting) of the principal axis 35 with respect to the x'y' plane.

Apart from the possibility of generating a 2D image, the device according to the application also has the possibility of providing images with distance information. Such information, which is also referred to hereinafter as 3D information for short, can be obtained in this case in various ways. The lateral resolution with which this 3D information is provided may differ here from the resolution of the 2D image.

In the case of the structure from FIG. 2, the two cameras 24a, 24b mounted spaced apart from one another are provided for example for the generation of 3D information. With the aid of images from both cameras 24a, 24b, 3D information can be obtained by way of stereoscopic methods, for example triangulation. Additionally provided for this purpose is the projector 25, which projects a structured light pattern, for example a grid or line or point pattern, onto the object, the 3D information being obtained from an analysis of the stereoscopic recording of the projected pattern.

Furthermore, patterns with which coordinates of individual structural elements (pattern elements) can be obtained from the image of the pattern may be used. Such patterns may be represented in the form of a position code or otherwise labeled point clouds (color, shapes, brightness). The additional information is used for rapidly resolving the correspondence problem, that is the assignment of imaging elements ("measuring beams") to actual surfaces. Such patterns are referred to in association with the application as 2D position-code patterns. With the aid of 2D position-code patterns, 3D information can be obtained with the aid of only one camera 24a or 24b. The achievable lateral resolution is high enough in the case of 2D position-code patterns to use imaging with lighting by the projected 2D position-code pattern as the 2D image that is taken as a basis for the contour determination.

Alternatively, other known imaging methods that can provide 3D information may be used, for example optical time-of-flight methods (TOF).

According to the invention, a portion of the 3D information provided is selected to determine surface coordinates of an object in space, and thereby ultimately the position and orientation. In this case, the selection of the portion of the 3D information is based on the two-dimensional contour information that was previously obtained from the 2D image of the object. Starting from the calculated contour line 33, a two-dimensional area 40 is selected for this purpose. In subsequent evaluation steps, only such 3D information that lies within the selected area 40 is taken into consideration. In FIG. 3, 3D measuring points 41 that lie within the selected area 40 and are available are entered. The 3D measuring points 41 are distinguished by 3 coordinates, two lateral coordinates and one coordinate that contains the distance information. The 3D measuring points 41 are entered at their respective lateral coordinates; the distance information is not represented in the figure. Usually, the 3D information is indicated in the form of spherical coordinates. The lateral coordinates are usually angular coordinates, the distance information information concerning a measured distance z' from the camera to the surface of the object. The angular coordinates are correlated with the x'y' coordinates of the 2D image.

The further evaluation of the 3D measuring points 41 is explained in more detail below on the basis of FIGS. 5 and 6. In the example of FIG. 3, the selected area 40 does not extend up to the calculated contour line 33. Instead, an area limit 42 that is kept at a distance from the calculated contour line 33 has been determined on the basis of the calculated contour line 33. The reason here is that a cylindrically symmetrical structure is assumed for the object. The z components of surface coordinates of the object surface change greatly as the calculated contour line 33 is approached. Since the corresponding gradient $\Delta z/\Delta x$ or $\Delta z/\Delta y$ has a pole in the area of the calculated contour line 33, there is a great probability that distance information from this area does not have a high degree of accuracy and is unsuitable for further evaluation. The exclusion of the peripheral region of the object in the area of the calculated contour line 33 prevents such presumably inaccurate measuring points from being taken into consideration in the further evaluation.

Figure 4:
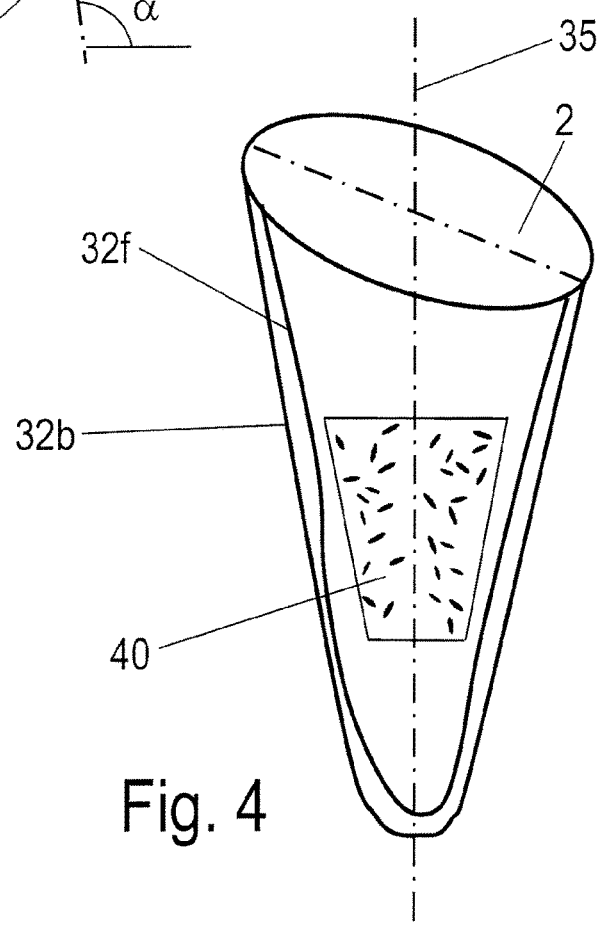
FIG. 4 shows a further schematic representation of contour information.

FIG. 4 illustrates a problem that occurs in the contour determination if a different lighting situation that the backlight situation is used. In FIG. 4, the tip of a teat 2 is represented in a schematically perspective form. A determined contour line 32b recorded in a backlight lighting situation is reproduced. It is assumed that there is no concealment or the like. The determined contour line 32b then corresponds substantially to the projection of the actual outer periphery of the teat 2 on the x'y' plane of the 2D image from which the contour line 32b is determined.

If on the other hand a different lighting situation is chosen, here by way of example a frontlight situation, a determined contour line 32f is obtained, lying within the area circumscribed by the determined contour line 32b. The reason is that, with a lighting situation from the direction in which the camera is positioned, only little light is reflected back in areas in which there is a very shallow (grazing) incidence of light. According to Lambert's law, the angular distribution of the intensity of light that is radiated from a two-dimensional element is proportional to the cosine of the viewing angle. Lambert's law applies both to the lighting situation and to the viewing situation. There is consequently a dependence on the square of the cosine of the viewing angle. With the determined contour line 32b, the viewing angle in the area of the periphery of the teat 2 tends toward 90°, and so the cosine tends toward zero. An edge detection based on contrasts then only finds a threshold value for an edge when there is little grazing light incidence, for which the square of the cosine of the angle of incidence is significantly greater than zero. On account of the approximately cylindrically symmetrical geometry of the teat 2, such a situation is obtained more in the direction of its center.

If a lighting situation different from the backlight lighting situation is chosen for the determination of the contours, a correlation between determined contour lines, depending on the size of the teat 2 considered, can however be established for different lighting situations by reference measurements performed in advance, which are performed with both lighting situations. From this correlation it is possible to derive a prescription for correction that allows a contour line 32f, recorded for example in a frontlight lighting situation, to be converted into a corrected countour line that reproduces as correctly as possible the actual dimensions of the teats 2.

Figure 5:
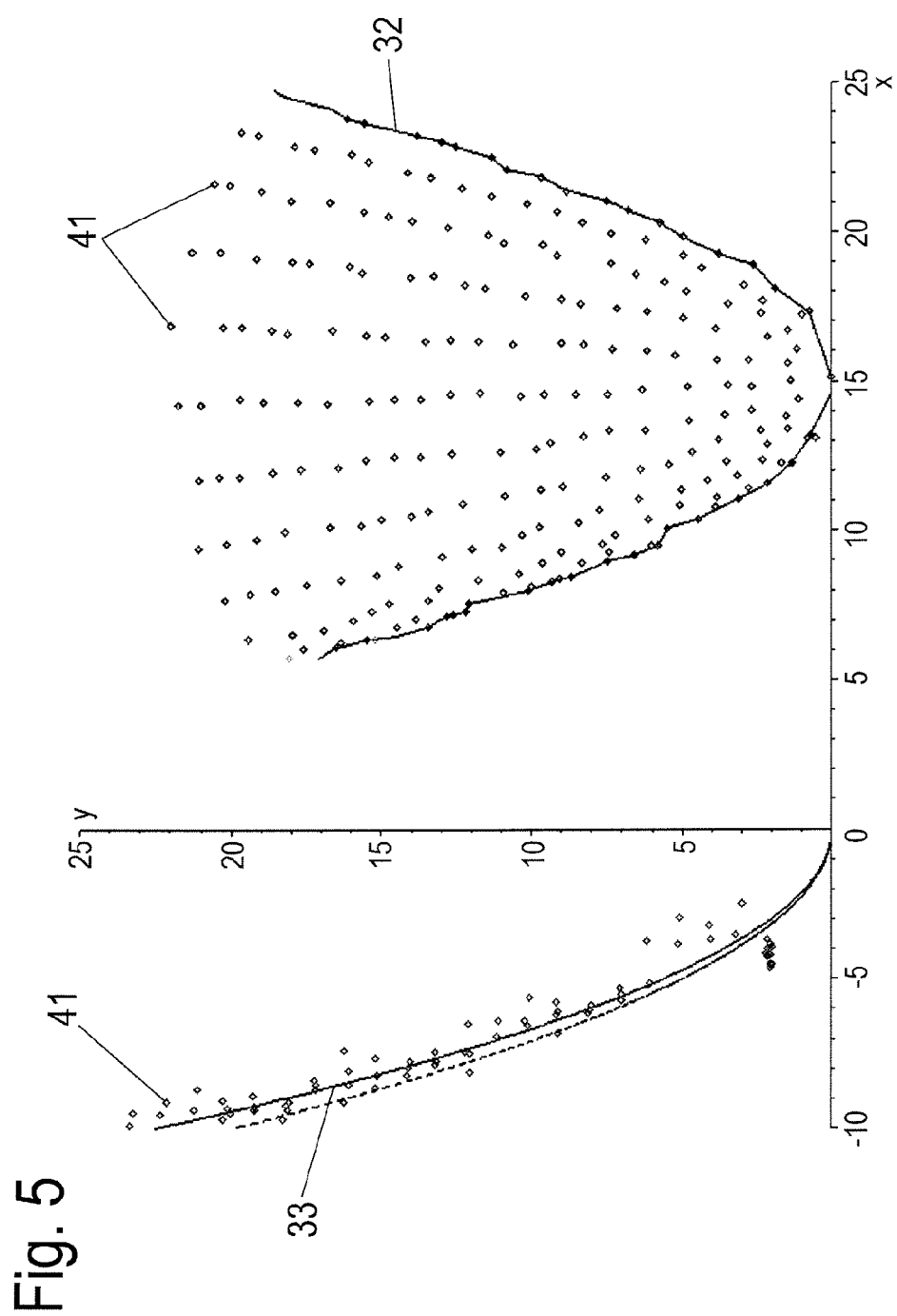
FIG. 5 shows a representation of 3D information evaluated in the course of a method according to the invention and FIG. 6 shows a further representation of 3D information evaluated in the course of a method according to the invention.

In FIG. 5, the further evaluation of the 3D information is represented. The 3D measuring points 41 are first converted from spherical coordinates into Cartesian object coordinates x, y, z. Then, a main focus 43 (cf. FIG. 3) of the 3D measuring points 41 is formed. In a first approximation, it is assumed that the principal axis 35 (cf. FIG. 3) of the model contour passes through this main focus 43. On this assumption, the model contour, that is the calculated contour line 33, can also be converted from the image coordinates x', y' into actual object coordinates x, y and z. Also the (provisional) position of the vertex 34 can be converted into object coordinates. The direction of the principal axis 35 is specified hereinafter by way of two angles α and β. The angle α describes a rotation of the principal axis 35 in the x' y' plane of the 2D image. This angle α could already have been determined from the 2D images. It can be assumed from now on to be known. Alternatively, a correction of its value is possible on the basis of the evaluation of the 3D information. The angle β describes a tilting of the principal axis 35 with respect to the x'y' plane of the 2D image, and is referred to hereinafter as the tilting angle β.

With the presumption already assumed above that the teat 2 is approximately cylindrically symmetrical, its surface contour can be described by a body of revolution of the model contour, that is the calculated contour line 33. Then the position of the body of revolution is varied in space in an optimization process in such a way that the 3D measuring points 41 lie as well as possible on the lateral surface of the calculated body of revolution. For this purpose, first the 3D measuring points 41 and the model are transformed into one and the same system of (Cartesian) coordinates. Subsequently, the model parameters are changed in such a way that the model describes the 3D measuring points 41 with the best possible quality. The sum of the squares of the distances of the 3D measuring points 41 from the surface of the model is expediently considered as a criterion. The aim of the calculation is to search for an absolute minimum of the criterion. For this purpose, the following parameters are changed: a translation of the vertex 34 by a displacement vector Δx, Δy, Δz and a rotation of the principal axis 35 by the angles α and β. Therefore, a multidimensional function of the criterion is investigated to find the absolute minimum.

This process is referred to as "matching" with a "parametric model". The model itself may alter thereby, for example the size of the teats and possibly also a shape parameter, for example the diameter, may alter due to swelling at the beginning of the milking process. For this reason, the model itself may be adapted slightly.

In particular, in the matching process the parameters not determined in advance, or only with insufficient accuracy, the tilting angle β and the distance of the vertex 34 from the camera, can be determined with a high degree of accuracy.

In the left-hand half of the figure from FIG. 5, the result of the optimization process is represented. For this purpose, the 3D measuring points 41 are projected onto the calculated contour line 33 taken as a basis for the body of revolution. The matching process means that the model parameters are known. On the basis of possible artefacts, finally a check of the extrapolation can take place. For this purpose, the 3D measuring points 41 are turned about the axis of rotation of the teats. By solving the transformation equation for z'=0, the traces of the 3D measuring points 41 in the x'y' plane are determined. These points are in this way mapped (projected) onto the likewise available 2D contour. In practice, an error remains, available for safety checks. At this point, corrections due to method-related measuring errors, for example due to displaced contours (for example in the absence of backlight lighting), can be realized.

It is found with the present example that the position of the 3D measuring points 41 is described well by the lateral surface of the body of revolution. A statistical evaluation of the remaining distances or squares of the distances between the 3D measuring points 41 and the surface of the body of revolution allows a statement to be made about the accuracy with which the position and the tilting of the body of revolution are determined. It may possibly be envisaged also to allow a variation of the angle α in the optimization process.

As a result, at the end of the optimization process the position of the vertex 34 and the direction of the principal axis (angles α, β) are fixed. Furthermore, surface coordinates of the body of revolution can be specified. The data determined are output and used for controlling a robot. In the example of FIG. 2, they are used for controlling the actuators 11 and the further actuators 16, in order to guide a milking cup with its openings up to the vertex 34, and consequently up to the tip, of the corresponding teat 2.

Figure 6:
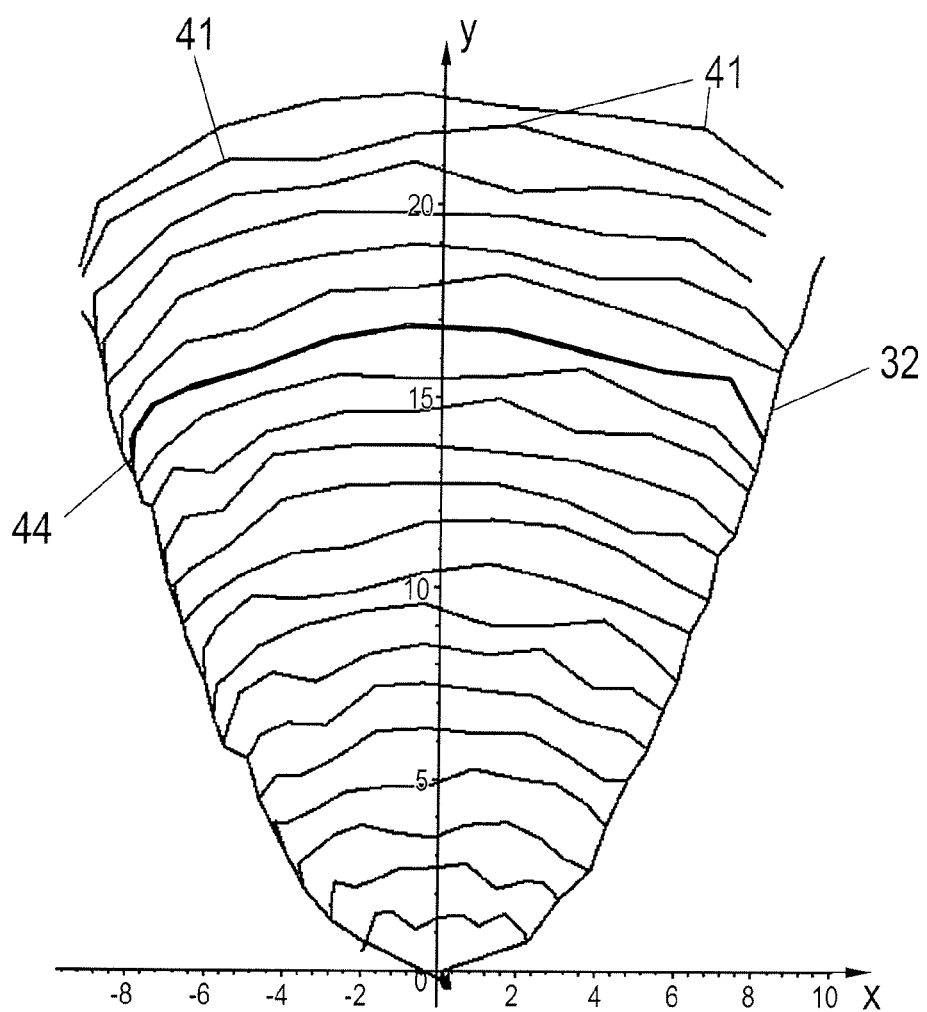

FIG. 6 shows a possibility for the simplified calculation of the tilting angle β, for the case in which the 3D information taken as a basis is determined by way of a triangulation method with the aid of a projected grid line. In the figure, 3D measuring points 41 are represented in a projection onto the x'y' plane of the 2D images. Moreover, a determined contour line 32 is depicted. The 3D measuring points 41 have been generated with the aid of a projector (cf. projector 25 from FIG. 2), which projects a square grid pattern. Correspondingly, the position of the projection beams in relation to one another is known.

In FIG. 6, 3D measuring points 41 that are generated on the basis of a horizontal line in a grid pattern of the projector are joined to one another. A family of curves that can be described by ellipse segments is thus produced. By way of example, such an ellipse segment is identified by the reference numeral 44. The ellipses result from intersections of the projector beams with the body of revolution that describes the object. With rotation by the correct tilting angle β, the ellipse segments are presented as segments of a straight line. With a prescribed shape of the body of revolution, the underlying optimization task can be transformed into a system of differential equations that can possibly be solved analytically. In this way, an accurate and particularly quick evaluation of the 3D information can be performed.

LIST OF DESIGNATIONS

1 Udder
2 Teat
10 Milking device
11 Actuator
12 Carrying arm
13 Milking cluster
14 Milk collector
15 Milk tube
16 Further actuator
17 Milking cup
18 Path of movement
20 Device
21 Image processing and control device
22 Control output
23 Data connection
24a,b Camera
25 Projector
30 Determined contour points
31 Presumed contour points
32 Determined contour line
32b Determined contour line (backlight)
32f Determined contour line (frontlight)
33 Calculated contour line
34 Extremum
35 Principal axis
40 Selected area
41 3D measuring point
42 Area limit
43 Main focus of the 3D measuring points
44 Ellipse segment
x', y' Image coordinates
z' Distance between camera and measuring point
x, y, z Object coordinates

The invention claimed is:

1. A method for optically determining the position and/or orientation of an object in space on the basis of image from a camera, the method comprising the steps of:
   recording a 2D image of the object and extracting 2D contour information from the image;
   calculating a model contour line depending on the 2D contour information;
   determining, on the basis of the model contour line, a determined area of the object;
   generating 3D information from the 2D image;
   selecting 3D measuring points from the 3D information that is situated within the determined area of the object; and
   determining a position and/or orientation of the object on the basis of the 3D measuring points, wherein a surface contour of the object is defined by a body of revolution of the model contour line, and wherein the position and/or the orientation of the body of revolution in space is varied such that the 3D measuring points from the determined area are situated closely to a lateral surface of the body of revolution, wherein the body of revolution has a principal axis, the position and orientation of which in space are varied, wherein the orientation of the principal axis is used in determining an orientation of the object in space.

2. The method of claim 1, wherein the 2D contour information is extracted from the 2D image as a contour line.

3. The method of claim 2, wherein the 2D image is recorded in a backlight lighting situation.

4. The method of claim 2, wherein the 2D image is recorded in a frontlight lighting situation, and the method further comprises the step of: correcting the contour line.

5. The method of claim 1, wherein the model contour line is calculated in relation to the determined contour line.

6. The method of claim 1, wherein the 3D information is generated stereoscopically from 2D images the camera and a second camera spaced apart from the camera.

7. The method of claim 1, wherein the 3D information is generated from 2D images from the camera when the object is lit up by a projector for the projection of a pattern.

8. The method of claim 7, wherein the pattern is selected from the group consisting of: a line, a grid, a point or a 2D position-code, or combinations thereof.

9. The method of claim 1, wherein the 3D information is generated from an optical time-of-flight measurement.

10. The method of claim 1, wherein a point of intersection of the body of revolution with the principal axis is determined and output as a position of a tip of the object in space.

11. The method of claim 1, wherein the object is the teat of a dairy animal.

12. A method for optically determining the position and/or orientation of an object in space on the basis of an image from a camera, the method comprising the steps of:
   recording a 2D image of the object and extracting 2D contour information from the image;
   calculating a model contour line depending on the 2D contour information;
   determining, on the basis of the model contour line, a determined area of the object;
   generating 3D information from the 2D image;
   selecting 3D measuring points from the 3D information that is situated within the determined area of the object; and
   determining a position and/or orientation of the object on the basis of the 3D measuring points, wherein a surface contour of the object is defined by a body of revolution of the model contour line, and wherein the position and/or the orientation of the body of revolution in space is varied such that the 3D measuring points from the selected area are situated closely to a lateral surface of the body of revolution, wherein the 2D image is recorded in a frontlight lighting situation, and the method further comprises the step of: correcting the contour line; and wherein the correction is based on a comparison of previously recorded contour lines, which were recorded in a backlight lighting situation and a frontlight lighting situation.

13. A method for optically determining the position and/or orientation of an object in space on the basis of an image from a camera, the method comprising the steps of:
   recording a 2D image of the object and extracting 2D contour information from the image;
   calculating a model contour line depending on the 2D contour information;
   determining, on the basis of the model contour line, a determined area of the object;
   generating 3D information from the 2D image;
   selecting 3D measuring points from the 3D information that is situated within the determined area of the object; and
   determining a position and/or orientation of the object on the basis of the 3D measuring points, wherein a surface contour of the object is defined by a body of revolution of the model contour line, and wherein the position and/or the orientation of the body of revolution in space is varied such that the 3D measuring points from the determined area of the object are situated closely to a lateral surface of the body of revolution, wherein the model contour line is calculated in relation to the determined contour line, and wherein the calculated contour line is described by a polynomial with even coefficients.

14. A device for optically determining the position and/or orientation of an object in space, the device comprising:
   a camera, for recording a 2D image of the object;
   a control device for: extracting 2D contour information from the image; calculating a model contour line depending on the 2D contour information; determining, on the basis of the model contour line, a determined area of the object; generating 3D information from the 2D image; selecting a 3D measuring points from within the determined area of the object; and determining a position and/or orientation of the object on the basis of the 3D measuring points, wherein a surface contour of the object is defined by a body of revolution of the model contour line, and wherein the position and/or the orientation of the body of revolution in space is varied such that the 3D measuring points from the determined area of the object are situated closely to a lateral surface of the body of revolution, wherein the body of revolution has a principal axis, the position and orientation of which in space are varied, wherein the orientation of the principal axis is used in determining an orientation of the object in space.

15. The device of claim 14, and further comprising: an additional camera spaced-apart from the camera.

16. The device of claim 14, and further comprising:
   a projector for the projection of pattern on the object.

17. The milking robot of claim 14, and further comprising: an additional camera spaced apart from the camera.

18. A milking robot comprising:
   a device for optically determining the position and/or orientation of an object in space and the device comprises:
- a camera, for recording a 2D image of the object;
- a control device for extracting 2D contour information from the image; calculating a model contour line depending on the 2D contour information determining, on the basis of the model contour line, a determined area of the object; generating 3D information from the 2D image, selecting 3D measuring points from within the determined area of the object; and determining a position and/or orientation of the object on the basis of the 3D measuring points, wherein a surface contour of the object is defined by a body of revolution of the model contour line, and wherein the position and/or the orientation of the body of revolution in space is varied such that the measured 3D information from the selected area is situated closely to a lateral surface of the body of revolution, wherein the body of revolution has a principal axis, the position and orientation of which in space are varied, wherein the orientation of the principal axis is used in determining an orientation of the object in space.

19. The milking robot of claim 18, and further comprising: a projector for the projection of a pattern.

* * * * *